United States Patent
Madhavan et al.

(10) Patent No.: US 9,152,676 B2
(45) Date of Patent: *Oct. 6, 2015

(54) IDENTIFYING QUERY ASPECTS

(71) Applicant: Google Inc., Mountain View, CA (US)

(72) Inventors: Jayant Madhavan, Fremont, CA (US); Fei Wu, Seattle, WA (US); Alon Yitzchak Halevy, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/908,456

(22) Filed: Jun. 3, 2013

(65) Prior Publication Data

US 2013/0268517 A1    Oct. 10, 2013

Related U.S. Application Data

(63) Continuation of application No. 12/512,908, filed on Jul. 30, 2009, now Pat. No. 8,458,171.

(60) Provisional application No. 61/148,897, filed on Jan. 30, 2009.

(51) Int. Cl.
*G06F 7/00* (2006.01)
*G06F 17/30* (2006.01)

(52) U.S. Cl.
CPC ...... *G06F 17/3053* (2013.01); *G06F 17/30672* (2013.01)

(58) Field of Classification Search
CPC ............ G06F 17/30029; G06F 17/278; G06F 17/30386; G06F 17/3053; G06F 17/30604; G06F 17/30867; G06F 17/30864; G06F 17/30719; G06F 17/30011

USPC .......... 707/723, 730, 731, 737, 749, 999.003
See application file for complete search history.

(56) References Cited

U.S. PATENT DOCUMENTS 5,278,980 A * 1/1994 Pedersen et al. ............. 1/1
6,947,930 B2 9/2005 Anick et al.
(Continued)

FOREIGN PATENT DOCUMENTS

WO    2006014683    10/2006

OTHER PUBLICATIONS

Authorized Officer Katrin Sommermeyer, International Search Report and Written Opinion for International Application No. PCT/US2010/022274, dated Jun. 8, 2010, 11 pages.

*Primary Examiner* — Mohammed R Uddin
(74) *Attorney, Agent, or Firm* — Middleton Reutlinger

(57) ABSTRACT

Methods, systems, and apparatus, including computer program products, for generating aspects associated with entities. In some implementations, a method includes receiving data identifying an entity; generating a group of candidate aspects for the entity; modifying the group of candidate aspects to generate a group of modified candidate aspects comprising combining similar candidate aspects and grouping candidate aspects using one or more aspect classes each associated with one or more candidate aspects; ranking one or more modified candidate aspects in the group of modified candidate aspects based on a diversity score and a popularity score; and storing an association between one or more highest ranked modified candidate aspects and the entity. The aspects can be used to organize and present search results in response to queries for the entity.

19 Claims, 8 Drawing Sheets

(56) References Cited

U.S. PATENT DOCUMENTS

| | | | |
|---|---|---|---|
| 7,185,001 B1 | 2/2007 | Burdick et al. | |
| 7,219,105 B2 * | 5/2007 | Kummamuru et al. | 1/1 |
| 7,415,461 B1 * | 8/2008 | Guha et al. | 1/1 |
| 7,577,655 B2 | 8/2009 | Curtiss et al. | |
| 7,617,176 B2 | 11/2009 | Zeng et al. | |
| 7,664,735 B2 | 2/2010 | Zhang et al. | |
| 7,769,740 B2 * | 8/2010 | Martinez et al. | 707/706 |
| 8,024,327 B2 | 9/2011 | Tunkelang et al. | |
| 8,150,813 B2 * | 4/2012 | Adair et al. | 707/692 |
| 8,510,298 B2 * | 8/2013 | Khandelwal | 707/731 |
| 8,626,491 B2 * | 1/2014 | Gattani et al. | 704/9 |
| 2004/0019588 A1 | 1/2004 | Doganata et al. | |
| 2004/0030689 A1 * | 2/2004 | Anderson et al. | 707/3 |
| 2004/0186827 A1 | 9/2004 | Anick et al. | |
| 2006/0117002 A1 | 6/2006 | Swen | |
| 2006/0149710 A1 * | 7/2006 | Koningstein et al. | 707/3 |
| 2007/0143265 A2 * | 6/2007 | Risberg et al. | 707/3 |
| 2007/0239713 A1 | 10/2007 | Leblang et al. | |
| 2008/0021860 A1 | 1/2008 | Wiegering et al. | |
| 2008/0215416 A1 | 9/2008 | Ismalon | |
| 2008/0235187 A1 | 9/2008 | Gade et al. | |
| 2008/0243830 A1 * | 10/2008 | Abhyanker | 707/5 |
| 2009/0037380 A1 * | 2/2009 | Jung et al. | 707/3 |
| 2009/0070325 A1 * | 3/2009 | Gabriel et al. | 707/5 |
| 2009/0125502 A1 * | 5/2009 | Ting et al. | 707/5 |
| 2009/0177644 A1 * | 7/2009 | Martinez et al. | 707/5 |
| 2009/0254512 A1 * | 10/2009 | Broder et al. | 707/2 |
| 2009/0282010 A1 * | 11/2009 | Vasudevan et al. | 707/4 |
| 2009/0282012 A1 * | 11/2009 | Konig et al. | 707/5 |
| 2009/0327223 A1 * | 12/2009 | Chakrabarti et al. | 707/3 |
| 2009/0327271 A1 | 12/2009 | Amitay et al. | |
| 2010/0138413 A1 | 6/2010 | Wu et al. | |
| 2011/0173175 A1 * | 7/2011 | Cone et al. | 707/708 |

* cited by examiner

IDENTIFYING QUERY ASPECTS

CROSS REFERENCE TO RELATED APPLICATIONS

This application is a continuation under 35 U.S.C. §120 of U.S. patent application Ser. No. 12/512,908, filed Jul. 30, 2009 and entitled "Identifying Query Aspects", which claims the benefit of U.S. Provisional Application Ser. No. 61/148,897, filed Jan. 30, 2009 and entitled "Identifying Query Aspects." All of the aforementioned patent applications are hereby incorporated by reference.

BACKGROUND

This specification relates to providing, in response to search queries, information identifying aspects of entities identified in the search queries, and using the aspects in presenting information in response to the search queries.

Internet search engines provide information about Internet accessible resources (e.g., Web pages, images, text documents, multimedia content) that are responsive to a user's search query and present information about the resources in a manner that is useful to the user. Internet search engines return a set of search results (e.g., as a ranked list of results) in response to a user submitted query. A search result includes, for example, a URL and a snippet of information from a corresponding resource. Conventional search engines are implemented under an assumption that the user's search query can be satisfied by a single result, and work to help the user find that result. Unfortunately, users are not always looking for a single result, but are instead using the query as a starting point for exploration of an unknown space of information about something that they may initially refer to in a generic way.

For example, a user may submit a query that names or refers to an entity as a starting point for exploring various aspects associated with that entity. When used in reference to operations of an information retrieval system, e.g., a search engine, the term "entity" refers to text that names or identifies something. This something can be any object that can have associated properties (e.g., an object in the physical, conceptual or mythical world). For example, an entity can refer a location, a person, a fictional character, a state, a thing, an idea, and so on. When the meaning is clear from context, and to avoid unnecessary verbiage, the term "entity" may also be used to refer to the thing itself.

Aspects are different axes of information along which additional information about an entity can be obtained. For example, for an entity "Hawaii", possible aspects can include "beaches," "hotels," and "weather." As with the term "entity", when used in reference to operations of an information retrieval system, e.g., a search engine, the term "aspect" refers to text that names the aspect in question, and otherwise, when the meaning is clear from context, the term may also be used to refer to the aspect itself.

A single ranked list of results provided by conventional search engines typically fail to provide users an overview of different aspects of the entity. Rather, the single ranked list often provides many results directed to a single or a small number of aspects. Additionally, the presented results typically do not identify the aspects represented.

SUMMARY

This specification describes technologies relating to identifying aspects associated with entities.

In general, one aspect of the subject matter described in this specification can be embodied in methods that include the actions of receiving a query in a computer system, the computer system comprising one or more computers, the query including an entity; generating in the computer system a group of candidate aspects for the entity; modifying in the computer system the group of candidate aspects to generate a group of modified candidate aspects comprising combining similar candidate aspects and grouping candidate aspects using one or more aspect classes each associated with one or more candidate aspects; ranking in the computer system one or more modified candidate aspects in the group of modified candidate aspects based on a diversity score and a popularity score; associating in the computer system one or more highest ranked modified candidate aspects with the entity; receiving in the computer system one or more sets of search results; and providing a presentation of the search results in response to the query, the presentation presenting the search results organized according to the aspects associated with the entity. Other embodiments of this aspect include corresponding systems, apparatus, and computer programs, configured to perform the actions of the methods, encoded on computer storage devices.

These and other embodiments can each optionally include one or more of the following features. The method can further include presenting a summary of information about an entity in accordance with an aspect. The one or more sets of search results can include a set of search results responsive to the query. Each of the one or more sets of search results can correspond to a respective aspect associated with the entity.

In general, another aspect of the subject matter described in this specification can be embodied in methods that include the actions of receiving data identifying an entity; generating in a computer system a group of candidate aspects for the entity, the computer system comprising one or more computers; modifying in the computer system the group of candidate aspects to generate a group of modified candidate aspects, comprising combining similar candidate aspects and grouping candidate aspects using one or more aspect classes each associated with one or more candidate aspects; ranking in the computer system one or more modified candidate aspects in the group of modified candidate aspects based on a diversity score and a popularity score; and storing an association of one or more of the highest ranked modified candidates aspects with the entity in a data storage device of the computer system. Other embodiments of this aspect include corresponding systems, apparatus, and computer programs, configured to perform the actions of the methods, encoded on computer storage devices.

These and other embodiments can each optionally include one or more of the following features. The method can further include receiving a query including the entity; identifying one or more aspects associated with the entity; receiving search results responsive to the query; and presenting the search results based on the identified aspects. The method can further include receiving a query including the entity; identifying one or more aspects associated with the entity; receiving one or more sets of search results, each set corresponding to one of the identified aspects; and presenting the search results based on the identified aspects.

The method can further include receiving data identifying one or more entity properties, where generating the group of candidate aspects includes using the one or more entity properties; and the one or more highest ranked candidates aspects are associated with both the entity and the entity properties. The method can further include associating the entity with a class, the class having one or more class members including the entity; and where generating the group of candidate aspects includes generating candidate aspects corresponding to the entity and the class. Generating the group of candidate aspects can include analyzing one or more first user search histories to identify queries associated with the entity; and analyzing one or more second user search histories to identify queries associated with a class member other than the entity.

Combining candidate aspects can include calculating similarity scores, where each similarity score is an estimate of similarity between two candidate aspects; and combining candidate aspects into a single modified candidate aspect based on the similarity scores. Each candidate aspect can be expressed as text and the similarity score between two candidate aspects can be based on a comparison of the strings of text associated with each candidate aspect. Calculating a similarity score between two candidate aspects can include receiving a respective set of search results for each aspect; and calculating the similarity score based on a comparison of the sets of search results. The comparison of the sets of search results can include a comparison of paths of the search results in one of the sets of search results to paths of the search results in the other one of the sets of search results. The comparison of the sets of search results can include a comparison of titles and snippets of the search results in one of the sets of search results to titles and snippets of the search results in the other one of the sets of search results. Combining candidate aspects based on the similarity scores can further include using a graph partition algorithm to determine which aspects to combine.

Grouping candidate aspects using one or more aspect classes can include associating two or more candidate aspects with a respective aspect class; and grouping two or more candidate aspects into a single modified candidate aspect based on their aspect classes. The single modified candidate aspect can be an aspect class.

Ranking one or more modified candidate aspects based on a diversity score and a popularity score can include calculating a popularity score for each aspect; ranking the aspect with the highest popularity score the highest; and ranking the remaining aspects by repeating the following steps one or more times: calculating a similarity score for each un-ranked aspect, where the similarity score compares the similarity of the un-ranked aspect to the ranked aspects; and assigning the next highest ranking to the aspect whose popularity score divided by its similarity score is the highest.

Particular embodiments of the subject matter described in this specification can be implemented so as to realize one or more of the following advantages. Aspects of an entity in a search query can be identified. Aspects can be presented to make it easy for users to explore the search space along multiple axes. The use of aspects allows a user to explore the search space beyond the scope of his or her original query. The presentation of aspects also allows a user to quickly gain an overview of what the possible axes of search are. The presentation of aspects can allow a user to browse a search space efficiently, for example, by using faceted browsing. Information related to the aspects can be identified and presented to the user. This information can allow a user to quickly gain information he or she needs about multiple aspects of the entity. Mashups can be presented to a user as a way of visualizing information about the aspects of the entity. The mashups present information associated with several aspects in a single integrated interface.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
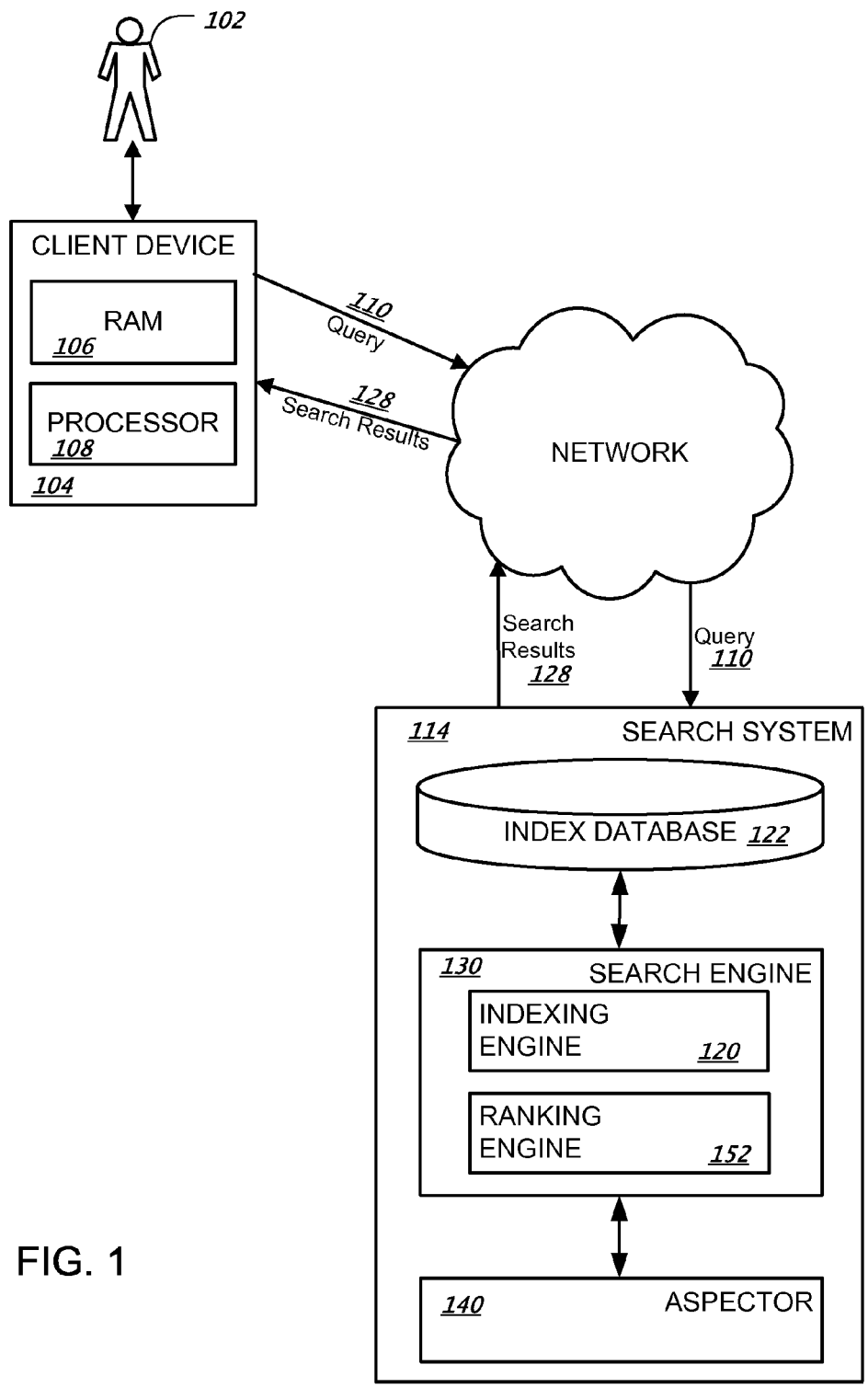
FIG. 1 illustrates an example search system for providing search results relevant to submitted queries.

FIG. 1 illustrates an example search system 114 for providing search results relevant to submitted queries as can be implemented in an internet, an intranet, or another client and server environment. The search system 114 is an example of an information retrieval system in which the systems, components, and techniques described below can be implemented.

A user 102 can interact with the search system 114 through a client device 104. For example, the client 104 can be a computer coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

A user 102 can submit a query 110 to a search engine 130 within a search system 114. When the user 102 submits a query 110, the query 110 is transmitted through a network to the search system 114. The search system 114 can be implemented as, for example, computer programs running on one or more computers in one or more locations that are coupled to each other through a network. The search system 114 includes an index database 122 and a search engine 130. The search system 114 responds to the query 110 by generating search results 128, which are transmitted through the network to the client device 104 in a form that can be presented to the user 102 (e.g., a search results web page to be displayed in a web browser running on the client device 104).

When the query 110 is received by the search engine 130, the search engine 130 identifies resources that match the query 110. The search engine 130 may also identify a particular "snippet" or section of each resource that is relevant to the query. The search engine 130 will generally include an indexing engine 120 that indexes resources (e.g., web pages, images, or news articles on the Internet) found in a corpus (e.g., a collection or repository of content), an index database 122 that stores the index information, and a ranking engine 152 (or other software) to rank the resources that match the query 110. The indexing and ranking of the resources can be performed using conventional techniques. The search engine 130 can transmit the search results 128 through the network to the client device 104, for example, for presentation to the user 102.

The search system 114 may also maintain one or more user search histories based on the queries it receives from a user. Generally speaking, a user search history stores a sequence of queries received from a user. User search histories may also include additional information such as which results were selected after a search was performed and how long each selected result was viewed.

In some implementations, the search system 114 includes an aspector 140. Alternatively, the aspector 140 can be implemented in one or more distinct systems coupled to the search system 114. The aspector 140 associates aspects with particular entities. Additionally, the aspector 140 can receive the query 110 and, in conjunction with the search engine 130, provide aspect based search results to the user 102. Identifying and using aspects will be described in greater detail below.

Figure 2:
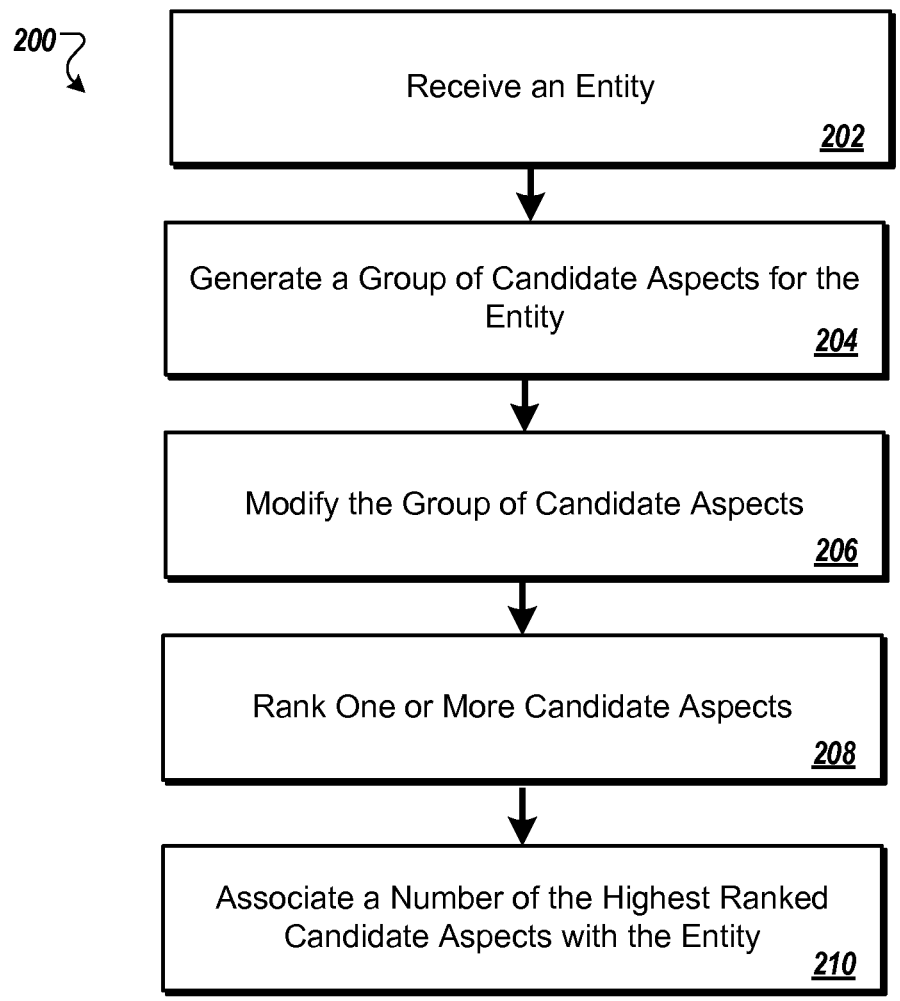
FIG. 2 illustrates an example method for associating aspects with an entity.

FIG. 2 illustrates an example method 200 for associating aspects with an entity. For convenience, the example method 200 will be described in reference to a system that performs the method 200. The system can be, for example, the search system 114, or a separate system.

The system receives an entity (step 202). An entity can be any object that can have associated properties (e.g., an object in the physical or conceptual world). For example, an entity can be a location, a person, a thing, an idea, etc. The system can receive the entities from a variety of sources. For example, the system can receive an entity directly from a user or in response to actions performed by the system (e.g., the action of executing a process). An entity can be extracted from a search query received from a user or the search system 114, for example, by parsing the query and comparing the terms of the query to a database of possible entities. Other sources of an entity are also possible, for example, an entity can be extracted from query data, such as user search histories.

In some implementations, the system also receives data identifying one or more properties of the entity. Properties of entities are additional elements associated with an entity that can be used to further refine the entity. For example, "travel" can be a property of the entity "Vietnam" because people travel to Vietnam.

The system generates a group of candidate aspects for the entity (step 204). The candidate aspects can be generated based on the entity, or alternatively, based on a class associated with the entity. The class is an abstraction of the entity. For example, "chocolate cake" could be associated with the class "food," because chocolate cake is a type of food. "Daffodil" could be associated with the class "flower," because a daffodil is a type of flower. The class can have multiple members. Each member is also an entity. For example, the class "flowers" could include many types of flowers, including "tulips," "alstroemeria," "roses," and so on.

In some implementations, both entity-based aspects and class-based aspects are used. Reliance on both entity-based aspects and class-based aspects can result in a more robust set of aspects. For example, some entities are so rare that there will be a small amount of data to base the aspects on. For these entities, relying on class based aspects can increase the number of candidate aspects. However, some entities are very popular and may have entity-specific aspects that can be identified, for example, from user search histories. Therefore, also including entity-based aspects can be useful for these more popular entities.

In some implementations, generating a group of candidate aspects for the entity includes analyzing query data for queries including the entity. The query data can be analyzed, for example, to identify query refinements and query super-strings.

A query refinement occurs when a user first issues a query for the entity, and then follows that query with another related query. For example, if a user issues a query for "popcorn" followed by a query for "microwave popcorn," microwave popcorn can be identified as a query refinement for popcorn. Query refinements do not have to include the original query. For example, if a user issues a query for "computer" followed by a query for "laptop," laptop can be identified as a query refinement for computer. Query refinements can provide valuable information about an entity, because they indicate how a given user chose to explore the search space for the entity.

Query refinements can be generated as follows. One or more user search histories including queries for the entity can be identified. Each user search history is then divided into sessions, where each session represents a group of queries issued by a given user for a given information finding task. A session can be measured in a number of ways including, for example, by a specified period of time (for example, thirty minutes), by a specified number of queries (for example, 15 queries), until a specified period of inactivity (for example, ten minutes without performing a search), or while a user is logged-in to a search system.

The sessions that do not include a query for the entity can be filtered out. The queries that follow a query for the entity in the remaining sessions are query refinements. Each of the query refinements indicates a potential candidate aspect. For example, a candidate aspect can be the query refinement itself, or the part of the query refinement that does not include the entity. Candidate aspects can also be identified by analyzing the query refinement using linguistic analysis techniques, for example, using dictionaries or statistical analysis to identify the terms in the query refinement that are most likely to be aspects, or by looking the query refinement up in a database that associates query refinements with aspects. Potential candidate aspects can be aggregated across users, and candidate aspects that do not appear more than a threshold number of times can be filtered out.

In some implementations, query refinements are generated for a query based on both the entity in the query and the entity's associated properties, instead of just the entity.

Generally speaking, a query is a super-string of another query when it includes the other query. For example, "Vietnam travel package" is a super-string of "Vietnam travel," because it includes the text "Vietnam travel." Unlike query-refinements, a query super-string does not have to be sent during the same session as the query for which it is a super-string.

Query super-strings can be generated by considering one or more user search histories and identifying queries that include the entity. Each query super-string indicates a potential candidate aspect. For example, a candidate aspect can be the part of the query super-string that does not include the entity. In some implementations, the query super-string is filtered to remove common words such as "a" and "the" before the candidate aspect is identified. Candidate aspects can also be identified from the query super-string using linguistic techniques or a database, as described above. Potential candidate aspects can be aggregated across users, and candidate aspects that do not appear more than a threshold number of times can be filtered out.

In some implementations, query super strings are identified for queries that include text naming the entity and its properties, rather than just the entity.

In some implementations, the system associates the entity with a class and generates class-based candidate aspects for the entity.

In some implementations, the system associates the entity with a class based on a pre-defined database that associates entities with classes. This pre-defined database can be generated, for example, by analyzing knowledge base information (e.g., information from Wikipedia™, run by the Wikimedia Foundation, or Freebase™ run by Metaweb Technologies). Generally speaking, a knowledge base is a collection of information for one or more entities. Knowledge bases can specify relationships between entities, such as class relationships, and can also specify features of entities. For example, a knowledge base could specify that "Canada" is in a class called "country" and that one of its features is its "GDP." Entity-class relationships can be identified from the knowledge base information, and associations based on the relationships can be stored in the database for future use. The pre-defined database can also be generated by querying the search system 114 for Hearst patterns, e.g., if the entity is "Boston," a query for "X such as Boston" can be issued to the search system. The results can then be analyzed for sentences including "such as Boston" and the resulting class can be identified. For example, if several of the search results included the phrase "cities such as Boston," then Boston could be associated with a class of "city." In some implementations, the entity does not have to be a perfect match with an entity in the database in order for an association to be identified. For example, small differences such as whether the entity is singular or plural may be overlooked. For example, if the singular "rose" was stored in the database, but the entity was "roses," the class information for rose could be used. Other small differences, such as spelling variations may also be overlooked.

In some implementations, the system associates the entity with a class on the fly, for example, by accessing knowledge base information (e.g., crawling a website such as Wikipedia™) and identifying a class associated with the received entity, or issuing a query with a Hearst pattern including the entity. Other techniques for associating an entity with a class are also possible. For example, the entity can be classified based on machine learning techniques, such as support vector machines. Alternatively, a user can specify the class that is associated with an entity.

Class-based aspects can be generated, for example, by analyzing query data for queries including a class member other than the entity. For example, if the entity was "daffodils" and its class was "flowers," then query data could be analyzed for queries including "roses," because "roses" is one of the members of the flowers class. The query data for the class member can be analyzed to identify aspects much as the query data for the entity is analyzed to identify aspects, as described above. When the entity is associated with one or more properties, these properties can be included with each class member for purposes of identifying aspects. In some implementations, class-based aspects are generated only from class members that are sufficiently close to the entity, e.g., within a threshold of time or space or another measure of distance between entities. For example, "Canada" "Belgium" and "France" are all in the class "country". However, Belgium and France are neighboring countries. Therefore, if the entity is "Belgium" the system can identify class-based aspects based on the class member "France" but not the class member "Canada," because Canada is too far away from Belgium. The threshold can be a number of miles, or a number of days, or other measures of distance. The threshold can be determined empirically.

Other methods of generating candidate aspects are also possible, for example, candidate aspects can be generated by analyzing knowledge base information associated with the entity or its class members. Knowledge bases can provide binary relationships between a given entity and its features. For example, Wikipedia™ provides an "Infobox" for some entities. The Infobox for Cambodia lists features such as capital, flag, population, area, and GDP. These can provide additional aspects for the entity Cambodia. Candidate aspects can also be retrieved from a database associating entities or class members with potential candidate aspects.

In some implementations, the candidate aspects are filtered based on user feedback on aspects that had been previously associated with entities and presented to users. The user feedback can indicate which aspects are useful aspects of an entity, and which aspects are not useful aspects of an entity. The user feedback can be used to directly filter out aspects that users have indicated are not useful. Alternatively, the user feedback can be used as training inputs to train a machine to filter candidate aspects using machine learning techniques.

The system modifies the group of candidate aspects (step 206). Modifying the group of candidate aspects can include combining similar candidate aspects and grouping candidate aspects based on a class of one or more candidate aspects. This combining and grouping reduces redundant aspects and helps focus the aspects on various axes of search.

Often similar aspects are generated. For example, for the query "Vietnam travel" the aspects "package" "packages" and "deal" could all be generated. All of these aspects refer to the same basic concept—a product bundling various aspects of a trip into one package. Consequently, these aspects can be combined into a single aspect.

Figure 3:
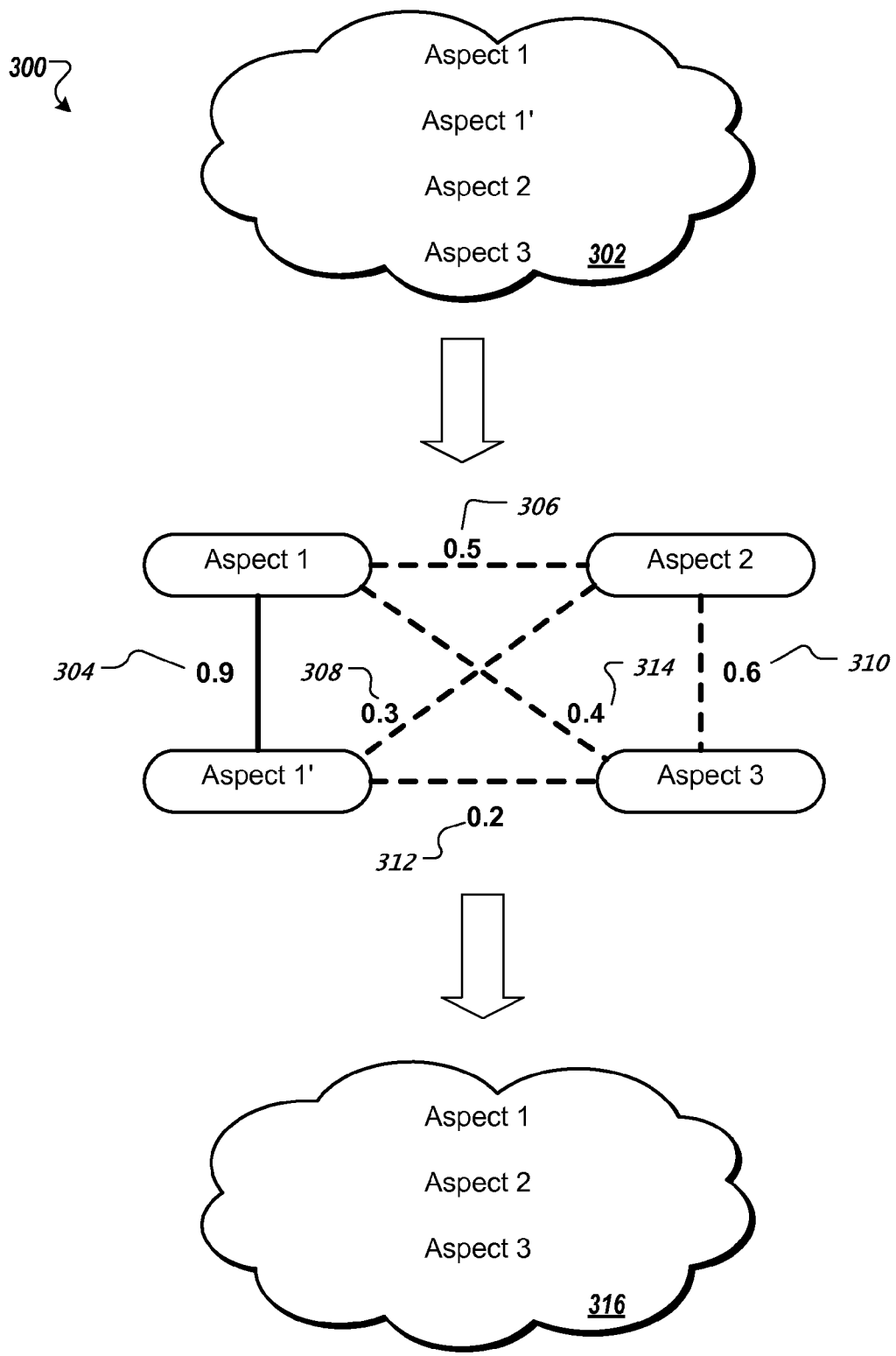
FIG. 3 illustrates an example of combining similar candidate aspects.

FIG. 3 illustrates an example of combining similar candidate aspects. An initial group of candidate aspects 302 contains four aspects: Aspect 1, Aspect 1', Aspect 2, and Aspect 3.

A similarity score can be calculated for each pair of aspects in the group of candidate aspects 302. For example, Aspect 1 and Aspect 1' have a similarity score 304 of 0.9. Aspect 1 and aspect 2 have a similarity score 306 of 0.5, and Aspect 1' and Aspect 2 have a similarity score 308 of 0.3.

In some implementations, calculating the similarity score for two aspects includes identifying a respective set of search results corresponding to a query for each aspect, and then comparing the search results. The search results can be generated by issuing a query to a search engine (e.g., search engine 130 in FIG. 1) for each aspect. The top n search results for each query are then chosen as the set of search results for the respective aspect (where n can be any integer chosen to give a sufficient amount of information for comparison, (e.g., 8 or 10)). For purposes of illustration, let $D_i$ be the set of search results $d_i \in D_i$ that correspond to a first aspect, and let $D_j$ be the set of search results $d_j \in D_j$ that correspond to a second aspect being compared to the first aspect. The similarity score for the two sets of search results, and therefore the two aspects, can be calculated as follows.

A feature vector is generated for each search result in $D_i$ and $D_j$. For example, a feature vector can include one or more features (e.g., terms) and a corresponding statistical measure of the importance of the feature to the user (e.g., a term frequency (tf) weight or a term frequency inverse document (tf-idf) weight for each feature). The terms can be all words in the search result, or a subset of the words of the search result (for example, the title of the result and the snippet identified by a search engine).

In some implementations, tf weights are used as statistical measures of the importance of a feature to the user. The tf weights can be used because the importance of a feature to the user can increase proportionally according to the frequency with which the feature occurs (e.g., a term frequency) in a collection of documents, for example, all documents indexed by the search system (e.g., search system 114 in FIG. 1), or all documents indexed by the search system that are in the same language as the term.

The term frequency in a search result is the relative frequency that a particular term occurs in the search result, and can be represented as:

$$tf_{q,p} = \frac{n_{q,p}}{\sum_k n_{k,p}},$$

where the term frequency is a number $n_{q,p}$ of occurrences of the particular term $t_q$ in a search result ($d_p$) divided by the number of occurrences of all terms $t_k$ in $d_p$.

In some implementations, tf-idf weights are used as the statistical measures of the importance of the features to the user. A tf-idf weight can be calculated by multiplying a term frequency with an inverse document frequency (idf).

The idf is an estimate of how frequently a term appears in a collection of documents, for example, all documents indexed by the search system, or all documents indexed by the search system that are in the same language as the term. The inverse document frequency can be represented as:

$$idf_q = \log \frac{|D|}{|D_p : t_q \in d_p|},$$

where the number D of all documents in the corpus of documents is divided by a number $D_p$ of documents $d_p$ containing the term $t_q$. In some implementations, the Napierian logarithm is used instead of the logarithm of base 10.

A tdf idf weight can be represented as:

$$tf\_idf_{q,p} = tf_{q,p} \cdot idf_{q,p}.$$

A similarity score is calculated for each pair of search results $\{d_i, d_j\}$. The similarity score for each pair can be calculated by determining the distance between the feature vectors for the two results. For example, if the a search result di has a feature vector of $X=(x_1, x_2, x_3)$ and a search result $d_j$ has a feature vector of $Y=(y_1, y_2, y_3)$, $sim(d_i,d_j)$ and a search result $d_j$ has a feature vector of $Y=(y_1, y_2, y_3)$, $Sim(d_i, d_j)$ can be represented as a cosine distance:

$$sim(d_i, d_j) = $$
$$\text{cosine distance} = \frac{X \cdot Y}{\|X\| \cdot \|Y\|} = \frac{x_1 \cdot y_1 + x_2 \cdot y_2 + x_3 \cdot y_3}{\sqrt{x_1^2 + x_2^2 + x_3^2} \cdot \sqrt{y_1^2 + y_2^2 + y_3^2}}.$$

The similarity score for the two sets of search results, $D_i$ and $D_j$, as a whole can be calculated based on the similarity scores between their individual search documents. In some implementations, the similarities for each pair of search results is averaged. In some implementations, the average of the highest similarity scores for each search result is used as follows:

$$sim(D_i, D_j) = \frac{\sum_i sim(d_i, D_j)}{2|D_i|} + \frac{\sum_j sim(d_j, D_i)}{2|D_j|},$$

where $$sim(d_i, D_j) = \max_k sim(d_i, d_k) \text{ and } sim(d_j, D_i) = \max_k sim(d_k, d_j),$$

and where $\max_k sim(d_i, d_k)$ is the maximum similarity score of the similarity scores between the search result $d_i$ and all search results in $D_j$, and $\max_k sim(d_k, d_j)$ is the maximum similarity score of the similarity scores between the search result $d_j$ and all search results in $D_i$.

Other similarity measures can also be used, for example, determining a single feature vector for all search results for each aspect and calculating the similarity scores based on the similarity of the two feature vectors, e.g., based on the cosine distance.

Alternatively, the similarity score for two aspects can be calculated by comparing the paths (e.g., web addresses, file paths) of the search results for each aspect, for example, by parsing the text of the paths and extracting features, such as a domain name or directory in a file system, and then comparing the extracted features. The similarity score for two aspects can also be calculated by comparing the text of the aspects themselves, for example, by comparing the characters in the text of the two aspects.

Once the similarity scores for each pair of aspects are identified, the similarity scores can be used to identify candidate aspects that should be combined into a single aspect. Various clustering techniques can be used to determine when two candidate aspects should be combined. For example, a graph partition algorithm can be used. The graph partition algorithm creates a graph where the nodes of the graph are the aspects and an edge connects two nodes if they are sufficiently similar (e.g., if their similarity score exceeds a threshold). For example, in FIG. 3, there is an edge (indicated by a solid line) between Aspect 1 and Aspect 1', because the similarity score between Aspect 1 and Aspect 1' is greater than the threshold value. However, there are no other connected edges in the graph. The threshold value can be determined empirically, for example, based on a set of test aspects. The graph partition algorithm then combines aspects that are connected into a single aspect. For example, in FIG. 3, the resulting set of aspects 316 lists only Aspect 1, Aspect 2, and Aspect 3. Aspect 1' has been combined with Aspect 1.

Combining two aspects can include keeping one aspect in the group of aspects and removing the other one from the group of aspects. The decision of which aspect to keep can be made, for example, by selecting the aspect with the highest popularity score. Aspect popularity scores are discussed in more detail below.

Other clustering techniques can be used, for example, k-means clustering (where aspects are divided into a predefined number of clusters based on the similarity scores), spectral clustering, hierarchical clustering, and star-clustering.

The candidate aspects can be grouped based on their classes. Aspect classes can be determined much as entity classes are determined, for example, as described above. In some implementations, determining an aspect class includes determining a synonym for the aspect, and then determining the synonym's class. For example, "New York University" is frequently abbreviated as "NYU." However, it may be difficult to determine an aspect class for "NYU," for example, because many knowledge bases only classify one of the possible names for a given entity. Therefore, there may be no data on which to base a classification of "NYU." However, the more formal "New York University" is more likely to be included in knowledge bases. Therefore, a class for "NYU" can be determined by associating "NYU" with its synonym "New York University" and then identifying a class for the synonym. Synonyms can be determined, for example, by looking the aspect up in a thesaurus or a dictionary. Synonyms can also be determined, for example, by using redirect web pages of a knowledge base such as Wikipedia™ The redirect pages indicate the mapping of various terms to a synonym that is classified by Wikipedia™.

Aspects can be different from a similarity score perspective but still related in the sense that they belong to the same class. When this occurs, the aspects can be grouped into the same class. For example, the aspects "New York," "San Francisco," and "Washington D.C." are different because they point to different cities with different food, culture, streets, etc., yet can all be associated with the class "U.S. cities." Thus, the aspects can be grouped into the class "U.S. cities." In some implementations, aspects are grouped into a sub-class of their class. For example, "New York" and "Washington D.C." are members of the class "U.S. cities" and the sub-class "East coast cities." Therefore, they could alternatively be grouped together into "East coast cities."

Figure 4:
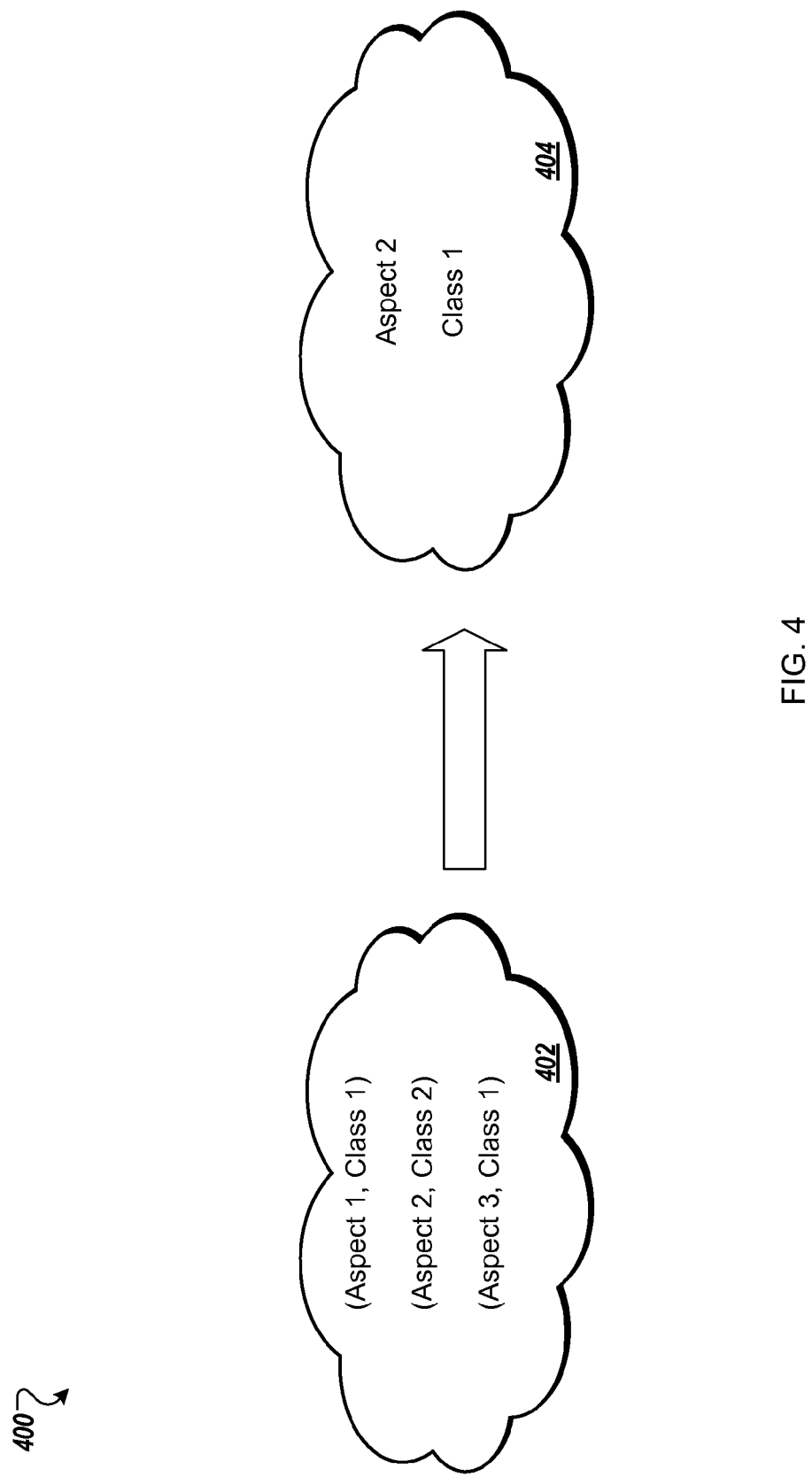
FIG. 4 illustrates an example of grouping aspects based on their aspect classes.

FIG. 4 illustrates an example of grouping aspects based on their aspect classes. A group of aspects 402 is each associated with a respective class. Aspect 1 and Aspect 3 are both in Class 1, while Aspect 2 is in Class 2. When the aspects are grouped based on their class, the new group of aspects 404 includes Aspect 2 and Class 1. Aspect 2 remains unchanged in the new group of aspects 404, because its class did not match the class of any other aspects. Aspect 1 and Aspect 3 were combined into a new aspect equal to their class, Class 1, because they had the same class.

In some implementations, some aspects are associated with multiple classes. Determining a class for these ambiguous aspects can be problematic. For example, imagine an entity "Vietnam" and two aspects "food" and "history." Both of these aspects are ambiguous. In addition to referring to something you can eat, "food" could refer to the "F.O.O.D." music album. In addition to referring to something in the past, "history" could refer to the "HIStory: Past, Present and Future, Book 1" music album. Thus, the two ambiguous aspects could be classified as "album," and then grouped together into an "album" aspect. Food and history are two distinct aspects for exploring Vietnam, and there is value in keeping them separate. Therefore, they should not be grouped together. In some implementations, ambiguous aspects are not grouped, in order to avoid this potential problem.

Ambiguous aspects can be identified, for example, by using a disambiguation database that identifies aspects with multiple meanings. Ambiguous aspects can also be identified, for example, by using disambiguation web pages of a website such as Wikipedia™. These disambiguation pages identify multiple meanings for a given aspect.

In some implementations, once the modified group of candidate aspects is determined, the group is filtered, for example, to remove potentially offensive aspects (e.g., porn filtering). This filtering can be done by comparing the aspects to a list of potentially offensive aspects, and removing any aspects that are on the list.

As shown in FIG. 2, the system ranks one or more of the candidate aspects for the entity (step 280). The candidate aspects are ranked based on a diversity score and a popularity score of each aspect. The goal of the ranking is to identify aspects that are both interesting to the user and diverse enough to give a user choices on where to next direct his or her search. Ranking can be performed as follows.

The highest ranked aspect is the aspect with a highest popularity score. The popularity score is a measure of how common the aspect is. Popularity scores can be calculated in various ways depending on how the aspect was generated.

When the aspect was generated as a query refinement, the popularity score can be based on the frequency with which the query refinement appears, for example, by taking the total number of sessions that the query refinement appears in and dividing by the total number of sessions.

For example, a popularity score $p_r(q_j|q)$ of a refinement $q_j$ of a query q can be calculated as follows:

$$p_r(q_j|q) = \frac{fq(q_j)}{\sum_j fq(q_j)},$$

where $fq(q_j)$ is the frequency with which the query refinement $q_j$ appears in the user search histories.

When the aspect was generated as a query super-string, the popularity score can be based on the frequency with which the query super-string appears in the user search histories, for example, by taking the total number of times the super-string appears in the search histories and dividing that by the total number of query super-strings in the user search history plus the total number of times that a query for the entity appears in the user search histories.

For example, the popularity score $p_{ss}(q_j|q)$ for a given query super string $q_j$ can be calculated as follows:

$$p_{ss}(q_j|q) = \frac{fq(q_j)}{fq(q) + \sum_j fq(q_j)},$$

where $fq(q_j)$ is the frequency with which the super-string query $q_j$ appears in the search histories, and $fq(q)$ is the frequency with which the query for the entity appears in the search histories.

The popularity score can also be calculated by dividing the total number of times the super-string appears in the search histories by the total number of query super-strings in the search histories, for example:

$$p_{ss}(q_j|q) = \frac{fq(q_j)}{\sum_j fq(q_j)}$$

When a query refinement and a query super-string are both identified as candidate aspects, the two can be combined into a single aspect. The popularity score for that aspect can be determined in a number of ways, including, for example, taking the higher of the two scores, taking the average of the two scores, or taking the lower of the two scores.

For example, the score $p_{inst}(q_j|q)$ for an aspect associated with given query $q_j$ which is both a query refinement and a query super-string can be calculated as follows:

$$p_{inst}(q_j|q) = \max(p(q_j|q), p_{ss}(q_j|q)).$$

When an aspect is identified by analyzing query log data for other class member entities in the same class as the entity, the popularity score can be generated for the aspect as described above, e.g., $$p_{inst}(a_i|q) = \max(p(a_i|q), p_{ss}(a_i|q)).$$

The popularity score for class-based aspects can be adjusted so that aspects associated with the class do not overwhelm aspects associated with the specific entity. Rarer entities require the class-based aspects in order to have a sufficient number and variety of aspects. However, more popular entities may have entity-based aspects that are more important than the class-based aspects. A balance can be struck by weighting the scores of the aspects.

For example, a candidate aspect $a_i$ of a query q which contains an entity of class C can be assigned a weighted score $p(a_i|q)$ as follows:

$$p(a_i|q) = \frac{p_{inst}(a_i|q) + K \times p_{class}(a_i|C)}{\sum_j p_{inst}(a_j|q) + K \times \sum_j p_{class}(a_j|C)},$$

where K is a design parameter controlling the relative importance of the individual score of the aspect and the class score and can be determined empirically and $$p_{class}(a|C) = \frac{Count(a)}{|C|},$$

where count(a) is the number of queries in the query log that included the aspect a, and |C| is the number of entities in the class C.

The popularity score for a class-based candidate aspect can also reflect how close the entity is to the class member the aspect is based on, e.g., from a time or space or other perspective. For example, if the entity is "November," an aspect based on the class member "December" might have a better score than an aspect based on the class member "May," because November is closer to December than May in the order of months. As another example, if the entity is "San Francisco," an aspect based on "Los Angeles" might have a better score than an aspect based on "New York," because San Francisco is closer to Los Angeles than New York from a distance perspective.

Other popularity scores are also envisioned. For example, the popularity score can be based on the click through rate for a given aspect, e.g., the number of times users selected a search result after issuing a query for the aspect (or the entity and the aspect), divided by the total number of times users issued queries for the aspect. The popularity score can also be based on the dwell time associated with one or more of the search results corresponding to a query for the aspect or the aspect and the entity. Dwell time is the amount of time a user spends viewing a search result. Dwell time can be a continuous number, such as the number of seconds a user spends viewing a search result, or it can be a discrete interval, for example "short clicks" corresponding to clicks of less than thirty seconds, "medium clicks" corresponding to clicks of more than thirty seconds but less than one minute, and "long clicks" corresponding to clicks of more than one minute. In some implementations, a longer dwell time of one or more results is associated with a higher popularity score. The score is higher because users found the results with a longer dwell time useful enough to view for a longer period of time.

Once the first aspect is ranked, subsequent aspects are ranked based on their popularity scores and a diversity score, e.g., a measure of how similar they are to the already ranked aspects. The diversity score for an un-ranked aspect can be generated, for example, by calculating a similarity score between the un-ranked aspect and each ranked aspect, and then taking the minimum, maximum, or average of the scores.

Figure 5:
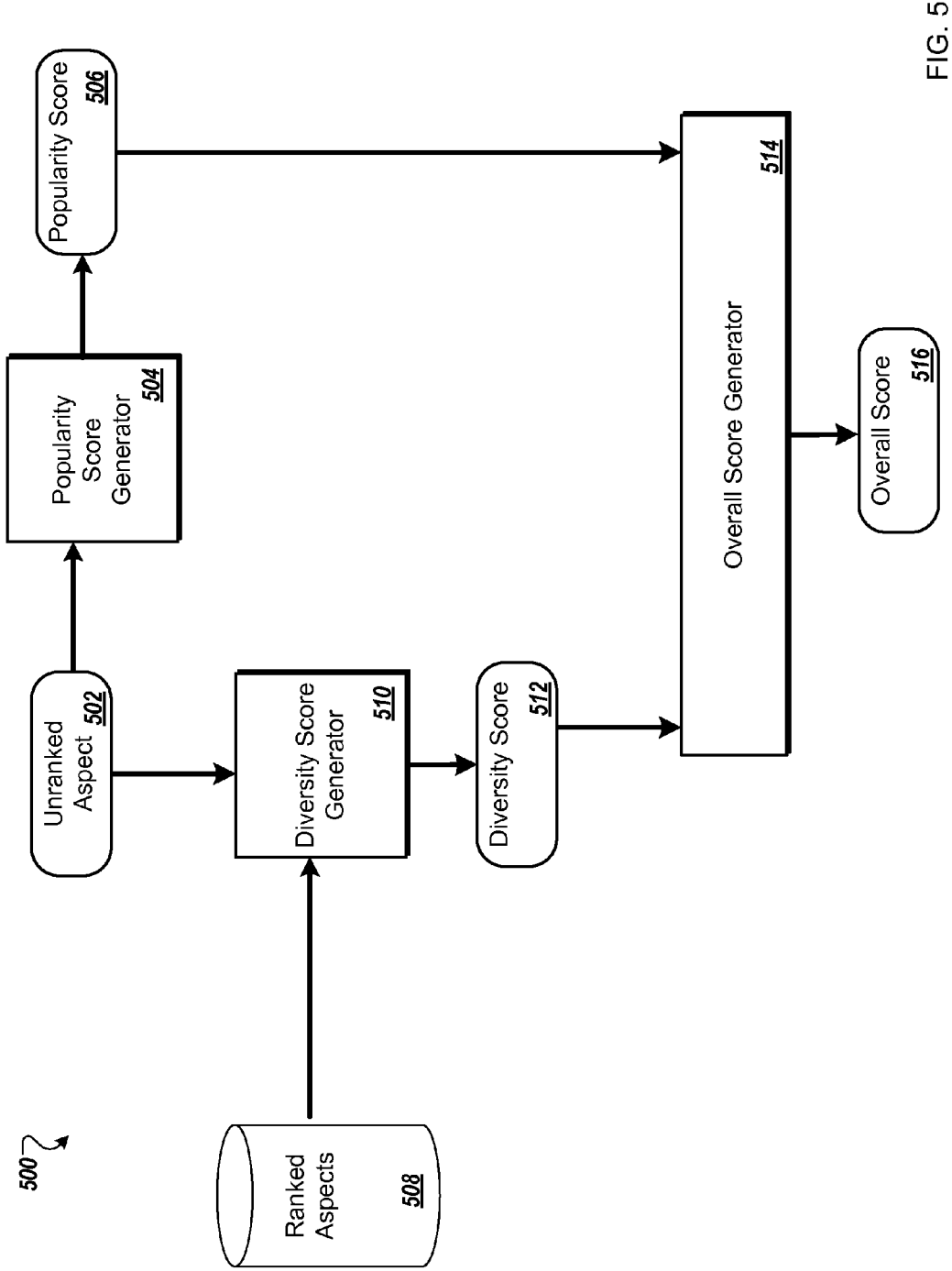
FIG. 5 illustrates an example of ranking an unranked aspect, given a pre-existing group of one or more ranked aspects.

FIG. 5 illustrates an example of ranking an unranked aspect 502, given a pre-existing group of one or more ranked aspects 508.

A popularity score 506 is generated for the unranked aspect 502 using a popularity score generator 504. The popularity score generator generates a popularity score for the aspect, for example, as described above. A diversity score 512 is then generated for the unranked aspect 502 by the diversity score generator 510. The diversity score 512 is an estimate of how similar the unranked aspect 502 is to the ranked aspects 508. The diversity score between the unranked aspect 502 and the set of ranked aspects 508 can be determined by calculating the similarity score between the unranked aspect 502 and each ranked aspect in the set 508, for example as described above, and then using the minimum, maximum, average, or sum of the scores as the diversity score.

Once the popularity score 506 and the diversity score 512 are generated, they are passed to an overall score generator 514. The overall score generator 514 generates an overall score 516 based on the popularity score 506 and the diversity score 612, for example, by dividing the popularity score 506 by the diversity score 512.

Other methods of ranking the candidate aspects are also envisioned. For example, the highest ranked candidate aspect can be chosen based on the popularity score, and all subsequent aspects can be chosen based on the diversity score (for example, by choosing the aspect with the lowest diversity score). The candidate aspects can also be ranked based just on their popularity scores or just on their diversity scores.

Returning to FIG. 2, the system then associates a number of the highest ranked candidate aspects with the entity, or the entity and its properties (step 210). Any number of candidate aspects can be associated with the entity (and its properties), based on the needs of the system and the storage capabilities of the system. For example, if the system will present the aspects to the user in a graphical environment where only a few aspects can be displayed at a time, the number of aspects may be small. In contrast, if the system might provide a large number of aspects to a user or process, the number of candidate aspects may be larger.

Once the number of highest ranked candidate aspects are associated with the entity (and its properties), the association is stored in a location accessible to the system, for example, in a database that associates a given entity with its aspects.

Figure 6:
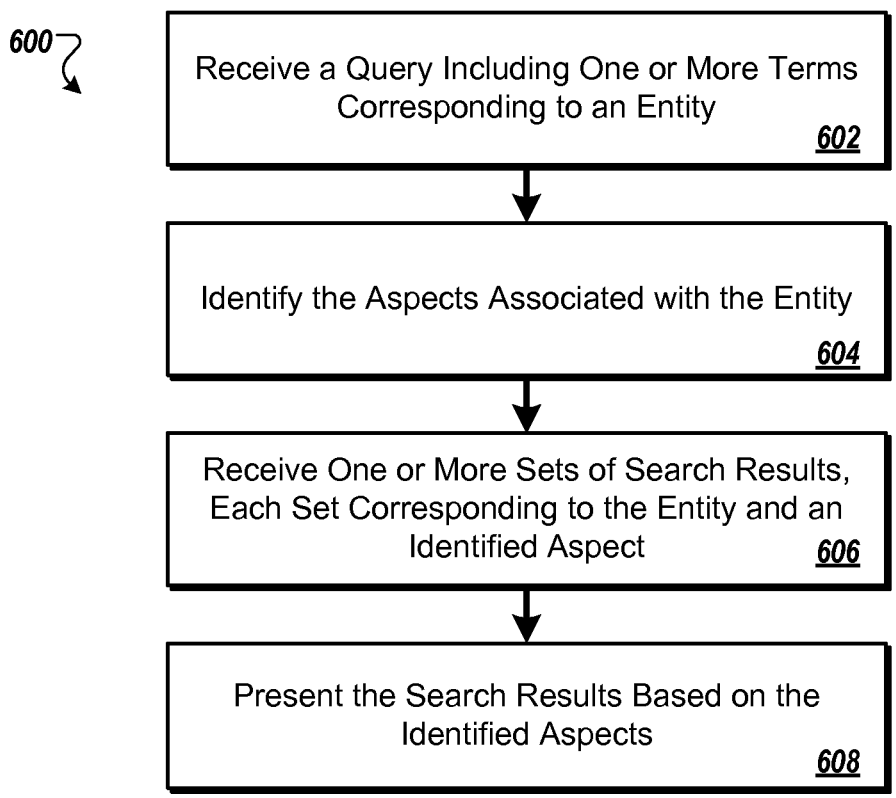
FIG. 6 illustrates an example method for receiving a query including one or more terms corresponding to an entity and presenting search results based on the identified aspects of the entity.

FIG. 6 illustrates an example method 600 for receiving a query including one or more terms corresponding to an entity and presenting search results based on the identified aspects of the entity. For convenience, the example method 600 will be described with reference to a system (e.g., the search system 114 of FIG. 1 or another system) that performs the method 600. The method can be performed in conjunction with the method described above in reference to FIG. 2.

The system receives a query including one or more terms corresponding to an entity (step 602). The query can be received, for example, from a user or from the search system 114. In some implementations, the system and the search system 114 are the same system.

The system identifies aspects associated with the entity (step 604). In some implementations, the query includes an entity and its properties, and the system can identify aspects associated with the entity and its properties. For example, if the query is "Hawaii vacation" then "Hawaii" could be identified as the entity, and "vacation" could be identified as a property of the entity "Hawaii." The aspects can be identified as described above in reference to FIG. 2, or can be retrieved, for example, from a database including ranked aspects generated using the method described above in reference to FIG. 2. The system can identify all aspects associated with the entity. When the aspects are ranked, the system can alternatively identify a top k number of the ranked aspects, where k is the number of aspects that are going to be presented to the user.

The system receives one or more sets of search results (step 606). Each set of search results corresponds to an entity and one of the identified aspects. For example, if the entity was "Hawaii" and the identified aspects were "beaches," "hotels," "weather," and "food," separate sets of search results could be received for "Hawaii beaches," "Hawaii hotels," "Hawaii weather," and "Hawaii food." The search results can be received in response to a query issued to the search engine 130 for the entity and an aspect.

The system presents the search results based on the identified aspects (step 608). In some implementations, the search results are presented in a "mashup," where relevant results and other information for one or more of the aspects are presented in one display, organized according to aspect.

Figure 7:
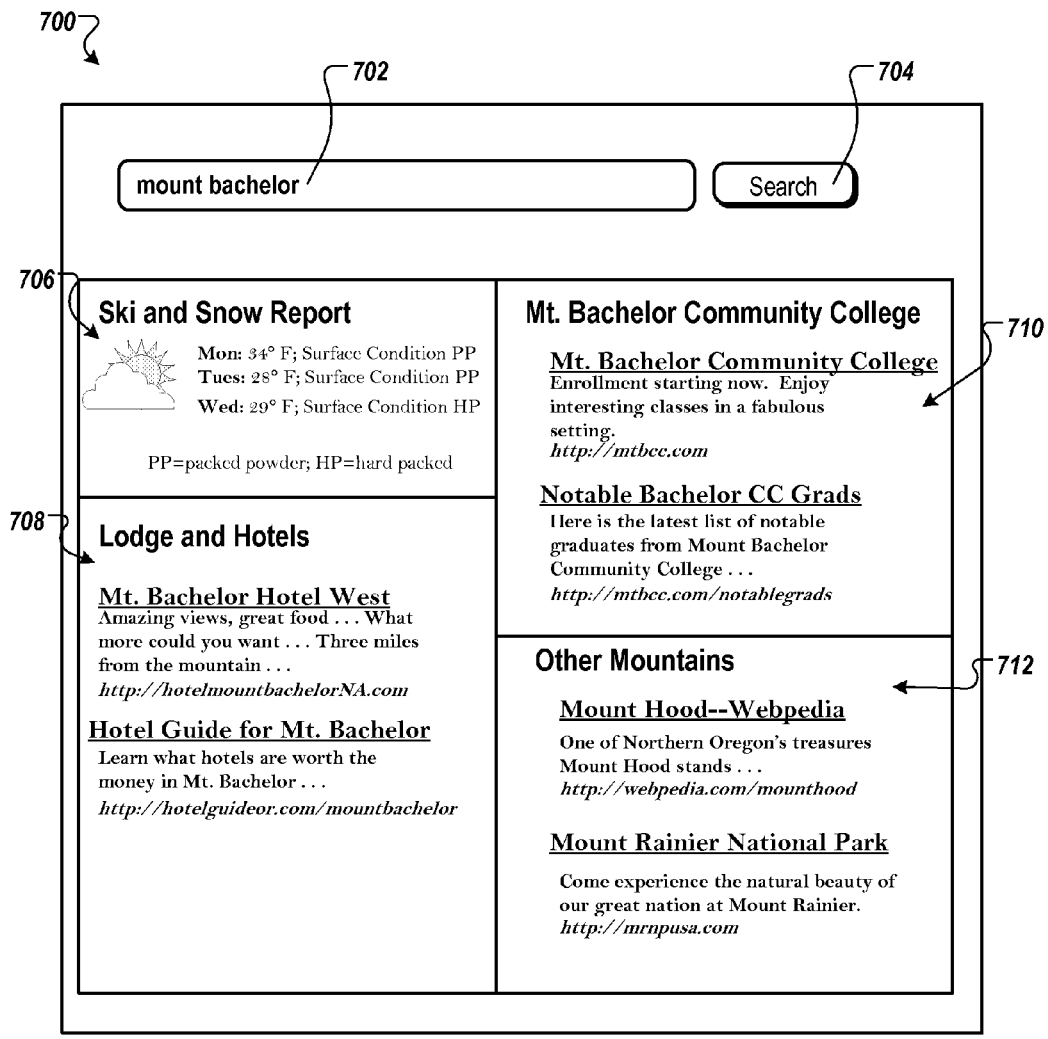
FIG. 7 illustrates an example mashup displayed after a user submits a search query.

FIG. 7 illustrates an example mashup displayed after a user submits a search query 702 for "mount bachelor" by clicking on the search button 704. Search results and other information corresponding to aspects for Mount Bachelor (e.g., "weather," "hotels" "community college" and "mountains") are labeled in accordance with the aspect and presented to the user in the boxes 706, 708, 710, and 712. The presentation of information can be tailored to the aspect. For example, a ski and snow report is presented in box 706 for users interested in the "weather" aspect. Search results corresponding to "hotels" are presented in box 708, search results corresponding to "community college" are presented in box 710, and search results corresponding to "mountains" are presented in box 712.

As FIG. 7 illustrates, all search results for a given aspect are not necessarily presented for that aspect. For example, more search results for the "hotels" aspect than the two search results that are presented can be received. The search results that are presented are chosen from the search results that are received, for example, by taking a top number of search results based on a ranking of the search results (e.g., a ranking provided by the search system 114). The number can be determined, for example, based on the number of aspects for the entity and/or the space available for presentation of the search results. Search results do not have to be presented for all identified aspects.

In some implementations, a summary of the entity in accordance with one of the aspects is presented. A summary of an entity in accordance with an aspect is a direct presentation of information that is available through search results corresponding to the entity and the aspect. For example, the ski and snow report presented in box 706 is a summary of information for the entity "mount bachelor" and the aspect "weather." A user interested in the "weather" aspect is likely interested in knowing the current weather, so rather than requiring the user to click on a search result to see weather information, the system can instead directly present information on the weather. As another example, if the entity is "University of Southern California football team" and the aspect is "season record," a summary of the team's season record can be presented. As yet another example, if the entity is a particular movie, and the aspect is movie reviews, then multiple reviews can be presented side by side. In some implementations, the summary is associated with an aspect and an entity in advance and stored, for example, in a database. The system can then retrieve the summary when needed.

Other methods of presenting the search results based on the aspects are also envisioned. For example, the system can create a separate web page for the search results corresponding to each aspect. Links to the web pages corresponding to the identified aspects can be presented along with search results for the original query. Alternatively, the links to the web pages can be presented as a separate web page. The system can present the aspects as "related search" options for the user, and then present the search results corresponding to a given aspect once a user selects the aspect.

In some implementations, the query includes terms corresponding to multiple entities. When the query includes multiple entities, the system can identify the aspects associated with each query, and then combine the identified aspects based on their rank (e.g., based on a popularity score and a diversity score of each aspect). Search results for the top ranked aspects can then be received and presented to the user. Alternatively, the system can present search results for the aspects corresponding to each of the entities separately.

In some implementations, the system receives search results corresponding to the entity, rather than the entity and an aspect (for example, from the search system 114). In these implementations, the search results can be grouped based on the aspects, for example, by sorting the search results based on the aspects, or using clustering techniques to cluster search results around the aspects. In these implementations, the search results can be presented based on the aspects as described above.

Figure 8:
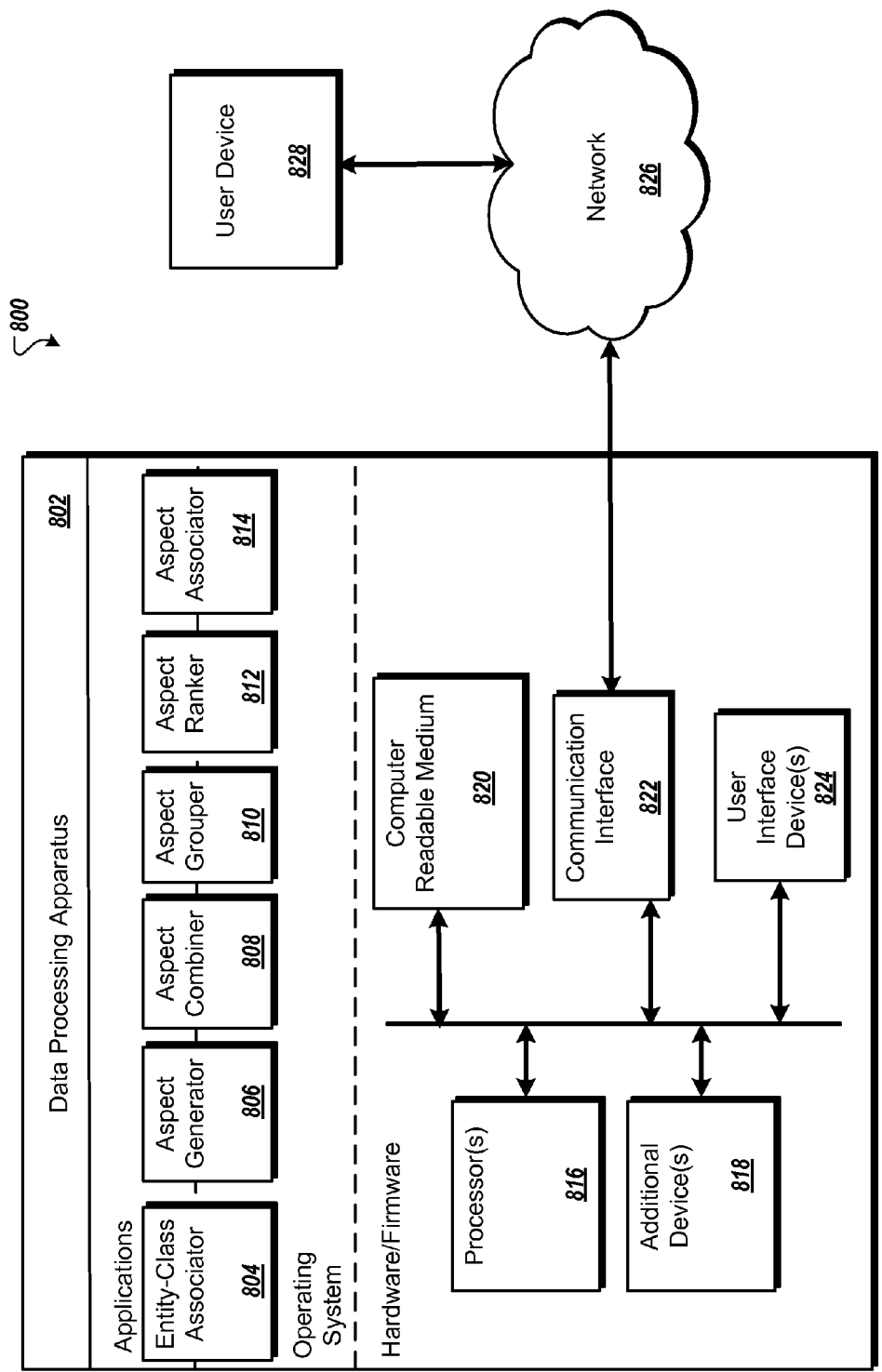
FIG. 8 illustrates an example architecture of a system.

FIG. 8 illustrates an example architecture of a system 800. The system generally includes a data processing apparatus 802 and a user device 828. The data processing apparatus 802 and user device 828 are connected through a network 826. In some implementations, the user device 828 and the data processing apparatus 802 are the same device.

While the data processing apparatus in 802 is shown as a single data processing apparatus, a plurality of data processing apparatus may be used. The data processing apparatus 802 runs a number of modules, for example, processes, e.g. executable software programs. In various implementations, these processes include an entity-class associator 804, aspect generator 806, aspect combiner 808, aspect grouper 810, aspect ranker 812, and aspect associator 814.

The entity-class associator 804 associates a given entity with a class, for example, based on a pre-defined database that associates entities with classes or by accessing knowledge-base information for the entity.

The aspect generator 806 generates aspects for a given entity, for example, as described above in reference to FIG. 2, by analyzing user search histories to identify query refinements and query superstrings for the entity, its class members, or the entity and its class members.

The aspect combiner 808 combines aspects, for example, as described above in reference to FIGS. 2 and 3, based on their similarity scores. The aspect combiner 808 may also calculate similarity scores for pairs of aspects as described above in reference to FIGS. 2 and 3.

The aspect grouper 810 groups aspects based on their class, for example, as described above in reference to FIGS. 2 and 4. In some implementations, the aspect combiner 808 and the aspect grouper 810 are the same process.

The aspect ranker 812 ranks aspects based on a popularity score and a diversity score of each aspect, for example, as described above in reference to FIGS. 2 and 5.

The aspect associator 814 associates one or more aspects with a given entity or a given entity and its properties, for example, as described above in reference to FIG. 2.

In some implementations, the data processing apparatus 802 stores one or more of an entity-class database associating a given entity with its class, an aspect-class database associating a given aspect with its class, user search histories, and an entity-aspect database associating a given entity with one or more aspects. In some implementations, the entity-class database and the aspect-class database are the same database. In some implementations, the data is stored on a computer readable medium 820. In some implementations, the data is stored on the additional device(s) 818.

The data processing apparatus 802 may also have hardware or firmware devices including one or more processors 816, one or more additional devices 818, computer readable medium 820, a communication interface 822, and one or more user interface devices 824. The processor(s) 816 are capable of processing instructions for execution. In one implementation, at least one of the processor(s) 816 is a single-threaded processor. In another implementation, at least one of the processor(s) 816 is a multi-threaded processor. The processor(s) 816 are capable of processing instructions stored in memory or on a storage device to display graphical information for a user interface on the user interface device(s) 824. User interface device(s) 824 can include, for example, a display, a camera, a speaker, a microphone, or a tactile feedback device.

The data processing apparatus 802 communicates with user device 828 using its communication interface 822.

The user device 828 can be any data processing apparatus, for example, a user's computer. A user uses the user device 828 to submit search queries through the network 826 to the data processing apparatus 802 and receive search results from the data processing apparatus 802, for example, through a web-browser run on the user device, for example, Firefox, available from the Mozilla Project in Mountain View, Calif. The user device 828 may present the search results to the user, for example, by displaying the results on a display device, transmitting sound corresponding to the results, or providing tactile feedback corresponding to the results. The search results may be organized according to aspects associated with the entity. When a user uses his or her computer to select a search result to view, information regarding the user selection can be sent to the data processing apparatus 802 and used to generate user search history data.

In some implementations, the user device 828 runs one or more of the modules 804, 806, 808, 810, 812, and 814 instead of or in addition to the data processing apparatus 802 running the modules.

While the system 800 of FIG. 8 envisions a user who submits a search query through his or her computer, the search query does not have to be received from a user or a user's computer, but can be received from any data processing apparatus, process, or person, for example a computer or a process run on a computer, with or without direct user input. Similarly, the results and aspects do not have to be presented to the user's computer but can be presented to any data processing apparatus, process, or person. The user search histories can be received from a population of users, and not necessarily from the same user device 828 used to receive search results organized based on aspects of an entity in the search query.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
   receiving a query in a computer system, the computer system comprising one or more computers, the query including an entity;
   parsing the query to extract the entity;
   generating in the computer system a group of candidate aspects for the entity;
   for each pair of one or more pairs of candidate aspects, calculating a similarity score for the pair based on identifying respective aspect sets of search results corresponding to respective queries of candidate aspects in the pair of candidate aspects and comparing search results in the aspect sets of search results;
   modifying in the computer system the group of candidate aspects to generate a group of modified candidate aspects based on the similarity score for the candidate aspects, the modifying comprising
      combining similar candidate aspects, and
      grouping candidate aspects using one or more aspect classes each associated with one or more candidate aspects;
   ranking in the computer system one or more modified candidate aspects in the group of modified candidate aspects based on a diversity score and a popularity score;
   associating in the computer system one or more highest ranked modified candidate aspects with the entity;
   receiving in the computer system one or more sets of search results; and
   providing a presentation of the search results in response to the query, the presentation presenting the search results organized according to the modified candidate aspects associated with the entity.

2. The method of claim 1, further comprising:
   presenting a summary of information about an entity in accordance with an aspect.

3. The method of claim 1, where the one or more sets of search results include a set of search results responsive to the query.

4. The method of claim 1, where each of the one or more sets of search results correspond to a respective aspect associated with the entity.

5. A method comprising:
receiving data identifying an entity;
parsing the data to extract the entity;
generating in a computer system a group of candidate aspects for the entity, the computer system comprising one or more computers;
for each pair of one or more pairs of candidate aspects, calculating a similarity score for the pair based on identifying respective aspect sets of search results corresponding to respective queries of candidate aspects in the pair of candidate aspects and comparing search results in the aspect sets of search results;
modifying in the computer system the group of candidate aspects to generate a group of modified candidate aspects based on the similarity score for the candidate aspects, the modifying comprising
combining similar candidate aspects, and
grouping candidate aspects using one or more aspect classes each associated with one or more candidate aspects;
ranking in the computer system one or more modified candidate aspects in the group of modified candidate aspects based on a diversity score and a popularity score; and
storing an association of one or more of the highest ranked modified candidate aspects with the entity in a data storage device of the computer system.

6. The method of claim 5, further comprising:
receiving a query including the entity;
identifying one or more aspects associated with the entity;
receiving search results responsive to the query; and
presenting the search results based on the identified aspects.

7. The method of claim 5, further comprising:
receiving a query including the entity;
identifying one or more aspects associated with the entity;
receiving one or more sets of search results, each set corresponding to one of the identified aspects; and
presenting the search results based on the identified aspects.

8. The method of claim 5, further comprising receiving data identifying one or more entity properties, where:
generating the group of candidate aspects includes using the one or more entity properties; and
the one or more highest ranked candidates aspects are associated with both the entity and the entity properties.

9. The method of claim 5, further comprising:
associating the entity with a class, the class having one or more class members including the entity; and
where generating the group of candidate aspects includes generating candidate aspects corresponding to the entity and the class.

10. The method of claim 9, where generating the group of candidate aspects includes:
analyzing one or more first user search histories to identify queries associated with the entity; and
analyzing one or more second user search histories to identify queries associated with a class member other than the entity.

11. The method of claim 5, where each similarity score is an estimate of similarity between two candidate aspects.

12. The method of claim 11, where combining candidate aspects based on the similarity scores further comprises:
using a graph partition algorithm to determine which aspects to combine.

13. The method of claim 5, where the comparison of the sets of search results includes a comparison of titles and snippets of the search results in one of the sets of search results to titles and snippets of the search results in the other one of the sets of search results.

14. The method of claim 5, where grouping candidate aspects using one or more aspect classes includes:
associating two or more candidate aspects with a respective aspect class; and
grouping two or more candidate aspects into a single modified candidate aspect based on their aspect classes.

15. The method of claim 5, where ranking one or more modified candidate aspects based on a diversity score and a popularity score includes:
calculating a popularity score for each aspect;
ranking the aspect with the highest popularity score the highest; and
ranking the remaining aspects by repeating the following steps one or more times:
calculating a similarity score for each un-ranked aspect, where the similarity score compares the similarity of the un-ranked aspect to the ranked aspects; and
assigning the next-highest ranking to the aspect whose popularity score divided by its similarity score is the highest.

16. A system comprising:
a processor; and
a computer storage medium including instructions, which, when executed by the processor, cause the processor to perform operations comprising:
receiving a query including an entity;
parsing the query to extract the entity;
generating a group of candidate aspects for the entity;
for each pair of one or more pairs of candidate aspects, calculating a similarity score for the pair based on identifying respective aspect sets of search results corresponding to respective queries of candidate aspects in the pair of candidate aspects and comparing search results in the aspect sets of search results;
modifying the group of candidate aspects to generate a group of modified candidate aspects based on the similarity score for the candidate aspects, the modifying comprising
combining similar candidate aspects, and
grouping candidate aspects using one or more aspect classes each associated with one or more candidate aspects;
ranking one or more modified candidate aspects in the group of modified candidate aspects based on a diversity score and a popularity score;
associating one or more highest ranked modified candidate aspects with the entity;
receiving one or more sets of search results; and
providing a presentation of the search results in response to the query, the presentation presenting the search results organized according to the aspects associated with the entity.

17. The system of claim 16, wherein the instructions further include instructions to cause the processor to perform an operation comprising:
presenting a summary of information about an entity in accordance with an aspect.

18. The system of claim 16, where the one or more sets of search results include a set of search results responsive to the query.

19. The system of claim 16, where each of the one or more sets of search results correspond to a respective aspect associated with the entity.

* * * * *